3,077,456
PHOSPHORESCENT GLASSES AND METHOD OF MAKING SAME
Carroll J. Billian, Perrysburg, Ohio, assignor to Owens-Illinois Glass Company, a corporation of Ohio
No Drawing. Filed Aug. 10, 1959, Ser. No. 832,423
9 Claims. (Cl. 252—301.6)

This invention relates to phosphorescent glasses and the method of making the same. More particularly this invention relates to conducting and non-conducting solder glasses which exhibit phosphorescence and to the method of preparing such solder glasses.

The use of zinc sulfide and cadmium sulfide including complexes thereof as phosphorescent material is well known. Moreover, methods for the incorporation of these phosphors in porcelain enamels are also well known. However, the use of a phosphor such as zinc sulfide in ground solder glass, whether conductive or non-conductive and then firing the same at such a low temperature as to leave the zinc sulfide unreacted is believed to be new. The resulting fired solder glass containing zinc sulfide exhibits phosphorescence and can be used as a sealing material or a decorative medium for illuminating clock dials and instrument panels.

Accordingly it is an object of this invention to provide a novel solder glass which exhibits luminescent properties when under the influence of radiant and electrical energy and to provide a method of making the same.

It is a further object of this invention to provide phosphorescent solder glasses as sealing and decorating media.

It is a further object of this invention to provide conducting and non-conducting solder glasses having phosphorescent properties.

It is a still further object of this invention to conduct the firing at low temperatures so as to prevent disintegration of the phosphor. Additional objects will be apparent from the description which follows.

The novel process of this invention comprises firing a mixture of ground solder glass and a phosphor such as zinc sulfide at temperatures under 400° C. whereby the glass resulting therefrom possesses phosphorescent properties.

The present invention will be more completely understood by reference to the following examples in which all parts and percentages are by weight unless otherwise specified.

EXAMPLE I

*Phosphorescent Solder Glass*

| Ingredients: | Parts |
|---|---|
| $B_2O_3$ | 8.10 |
| ZnO | 12.31 |
| PbO | 73.67 |
| $SiO_2$ | 1.92 |
| ZnS | 4.0 |

A glass in powder form consisting of the above ingredients, namely, $B_2O_3$, ZnO, PbO and $SiO_2$ in the proportions by weight set forth, was mixed with the aforementioned weight of the phosphor, ZnS, and shaped into patties of 1 mm. thick and 1 inch in diameter using a binder of 1.5% nitrocellulose in amyl acetate and fired at 380° C. for 20 minutes. The resulting solder glass exhibited phosphorescence and was suitable for clock dials, instrument panels, and the like.

EXAMPLE II

The procedure of Example I was repeated with the same results except that 1 part of ZnS was used and a proportionate larger amount (99 parts) of $B_2O_3$, ZnO, PbO, and $SiO_2$.

EXAMPLE III

The procedure of Example I was repeated with the same results except that 8 parts of ZnS were used and a proportionate lesser amount (92 parts) of $B_2O_3$, ZnO, PbO, and $SiO_2$.

EXAMPLE IV

*Phosphorescent Solder Glass (Conducting)*

| Ingredients: | Parts |
|---|---|
| $B_2O_3$ | 7.7 |
| ZnO | 11.7 |
| PbO | 70.0 |
| $SiO_2$ | 1.8 |
| ZnS | 3.8 |
| Ag | 5.0 |

Patties, which were formed as in Example I above and fired at 380° C. for 20 minutes, had an electrical resistance of about ½ ohm using silver paint for contact spots. Using three different current sources for excitation, namely, a D.C. source (20 ampere limit), a 60 cycle A.C. source (6 ampere limit), and 60–6000 cycle A.C. source (2 ampere limit), it was noted that a visible glow occurred at 2 amperes. Higher current intensities gave brighter glows providing the amperage did not exceed 8–10 amperes when melting of the patties or samples occurred.

EXAMPLE V

*Phosphorescent Solder Glass (Conducting)*

The procedure of Example IV was repeated with the same results of phosphorescence but the following composition was used.

| Ingredients: | Parts |
|---|---|
| $B_2O_3$ | 7.4 |
| ZnO | 11.2 |
| PbO | 67.1 |
| $SiO_2$ | 1.7 |
| ZnS | 7.6 |
| Ag | 5.0 |

EXAMPLE VI

*Phosphorescent Solder Glass (Conducting)*

The procedure of Example IV was repeated with the same results of conductive phosphorescence but the following was used.

| Ingredients: | Parts |
|---|---|
| $B_2O_3$ | 7.3 |
| ZnO | 11.0 |
| PbO | 66.4 |
| $SiO_2$ | 1.7 |
| ZnS | 3.6 |
| Ag | 10.0 |

EXAMPLE VII

*Phosphorescent Solder Glass (Conducting)*

The procedure of Example IV was repeated with the same results of phosphorescence but the following composition was used.

| Ingredients: | Parts |
|---|---|
| $B_2O_3$ | 7.0 |
| ZnO | 10.6 |
| PbO | 63.5 |
| $SiO_2$ | 1.7 |
| ZnS | 7.2 |
| Ag | 10.0 |

The above examples are merely by way of illustration and variations apparent to one skilled in the art may be made without departing from the spirit of the invention disclosed. For example, other phospors such as CdS may be employed. In addition other solder-glass compositions may be employed such as the following.

| Ingredients: | Parts |
| --- | --- |
| $B_2O_3$ | 8.95 |
| ZnO | 12.83 |
| PbO | 76.22 |
| $SiO_2$ | 2.0 |

In general it has been found that ground glass compositions which consist of about 75–80% PbO; of about 7–14% ZnO; of about 7–10% $B_2O_3$; and of about 1.5–3% $SiO_2$ to which has been added from 1–10% of a phospor such as ZnS provide not only the properties of a low softening temperature and satisfactory thermal expansion and contraction but phosphorescence. However, the preferred range of phospor in the above composition is from 4–8%. Where conductance is also desired, the further addition of 5–10% of a conductor such as silver may be employed with excellent results. Although the above ground glass and phosphor-silver mixture may be heated from 4 to 40 minutes and from 360–440° C., the preferred heating period is 4 to 20 minutes and the preferred temperature range is 380–400° C. Care must be taken not to heat the glass mixture for an unduly long period of time even at the lower temperatures since the phosphor will lose its phosphorescent properties. However, the duration of the heating period for a given temperature can be readily determined for each glass composition by routine testing.

It is obvious that various modifications may be made in the above formulations which would still come within the scope of the present invention. For example other conducting materials such as gold and platinum may be employed with equally good results. Moreover, organic binders other than nitrocellulose in amyl acetate may be used without departing from the spirit of the invention herein disclosed. Organic binders which I have found satisfactory include gelatin dissolved in water, camphor with cellulose nitrate, dibutyl phthalate with cellulose acetate, amyl and butyl alcohols, paraffin, biphenyl, etc.

As indicated by the modifications given above, it is to be understood that within the scope of the appended claims, the invention may be practiced otherwise than as specifically described.

The term firing as employed herein means heating the composition until it is sintered or fused.

I claim:

1. A method of preparing phosphorescent solder glasses comprising firing at a temperature of about 380–400° C. and for a period of about 4–20 minutes, a powdered glass mixture of the following range in composition: 75 to 80% PbO; 7 to 14% ZnO; 7 to 10% $B_2O_3$; and 1.5 to 3% $SiO_2$ to which has been added from 1 to 10% of a phosphor selected from the class consisting of zinc sulfide and cadmium sulfide.

2. A method of preparing phosphorescent solder glasses comprising firing at a temperature of about 380° C. for a period of about 20 minutes, a powdered glass mixture of the following composition: 75 to 80% PbO; 7 to 14% ZnO; 7 to 10% $B_2O_3$; and 1.5 to 3% $SiO_2$ to which has been added from 1 to 10% of a phosphor selected from the class consisting of zinc sulfide and cadmium sulfide.

3. A method of preparing phosphorescent solder glasses comprising firing at a temperature of about 380–400° C. and for a period of about 4 to 20 minutes, a powdered glass mixture of the following composition: 75 to 80% PbO; 7 to 10% $B_2O_3$; 7 to 14% ZnO; and 1.5 to 3% $SiO_2$ and which has added to said mixture (a) from 1 to 10% of a phosphor selected from the class consisting of zinc sulfide and cadmium sulfide and (b) from 5 to 10% of a conducting material selected from the class consisting of silver, gold and platinum.

4. A method of preparing phosphorescent solder glasses comprising firing at a temperature of about 380° and for a period of about 20 minutes, a powdered glass mixture of the following composition: 75 to 80% PbO; 7 to 10% $B_2O_3$; 7 to 14% ZnO; and 1.5 to 3% $SiO_2$ and which has added to said mixture (a) from 1 to 10% of a phosphor selected from the class consisting of zinc sulfide and cadmium sulfide and (b) from 5 to 10% of a conducting material selected from the class consisting of silver, gold and platinum.

5. The method of claim 4 in which the phosphor is zinc sulfide and the conducting material is silver.

6. A method of preparing phosphorescent solder glasses comprising firing at a temperature of about 360 to 440° C. and for a period of about 4 to 40 minutes, a powdered glass mixture of the following composition: 75 to 80% PbO; 7 to 14% ZnO; 7 to 10% $B_2O_3$; and 1.5 to 3% $SiO_2$ to which has been added from 1 to 10% of a phosphor selected from the class consisting of zinc sulfide and cadmium sulfide.

7. A method of preparing phosphorescent solder glasses comprising firing at a temperature of about 360 to 440° C. and for a period of about 4 to 40 minutes, a powdered glass mixture of the following composition: 75 to 80% PbO; 7 to 14% ZnO; 7 to 10% $B_2O_3$; and 1.5 to 3% $SiO_2$ to which has been added from 1 to 10% of a phosphor selected from the class consisting of zinc sulfide and cadmium sulfide and from 5 to 10% of a conducting material.

8. The product produced by the method of claim 6.

9. The product produced by the method of claim 7.

References Cited in the file of this patent

UNITED STATES PATENTS

| 2,130,215 | Young | Sept. 13, 1938 |
| 2,643,020 | Dalton | June 23, 1953 |
| 2,837,487 | Huttar | June 3, 1958 |
| 2,866,117 | Walker et al. | Dec. 23, 1958 |
| 2,924,540 | D'Andrea | Feb. 9, 1960 |
| 2,945,128 | Kuan-Han Sun et al. | July 12, 1960 |

FOREIGN PATENTS

| 625,466 | Great Britain | June 28, 1949 |

OTHER REFERENCES

Egelstaff: "Glass Scintillators for Prompt Detection of Intermediate Energy Neutrons," Nuclear Instruments 1 (1957), 197–199; North Holland Publ. Co., Amsterdam.